US011881372B2

(12) United States Patent
Camporeale et al.

(10) Patent No.: US 11,881,372 B2
(45) Date of Patent: Jan. 23, 2024

(54) TRANSFORMER COMPRISING A LOAD BREAK ROTARY SWITCH

(71) Applicant: HITACHI ENERGY LTD, Zürich (CH)

(72) Inventors: Carlo Camporeale, Padua (IT); Francesco Medea, Sant'Elena (IT)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/035,338

(22) PCT Filed: Nov. 5, 2021

(86) PCT No.: PCT/EP2021/080729
§ 371 (c)(1),
(2) Date: May 4, 2023

(87) PCT Pub. No.: WO2022/096627
PCT Pub. Date: May 12, 2022

(65) Prior Publication Data
US 2023/0352251 A1 Nov. 2, 2023

(30) Foreign Application Priority Data
Nov. 6, 2020 (EP) .................................... 20206140

(51) Int. Cl.
*H01H 9/00* (2006.01)
*H01H 9/16* (2006.01)

(52) U.S. Cl.
CPC ............ *H01H 9/0005* (2013.01); *H01H 9/16* (2013.01)

(58) Field of Classification Search
CPC ........ H01H 9/0005; H01H 9/16; H01H 36/00; H01H 33/68; H01H 19/14; H01H 9/0066; H01H 36/0046; H01H 9/167
See application file for complete search history.

(56) References Cited

U.S. PATENT DOCUMENTS 3,624,319 A * 11/1971 Ristuccia ............. H01H 9/0005 200/11 D
3,652,812 A * 3/1972 Ristuccia ............. H01H 9/0005 200/8 R
5,315,078 A * 5/1994 Freymuller .......... H01H 9/0005 200/11 TC

FOREIGN PATENT DOCUMENTS

CN 201859807 U 6/2011
SE 1951354 A1 2/2020
WO 2007075363 A2 7/2007

OTHER PUBLICATIONS

International Search Report and Written Opinion of the International Searching Authority, PCT/EP2021/080729, dated May 2, 2022, 13 pages.

* cited by examiner

*Primary Examiner* — Edwin A. Leon
(74) *Attorney, Agent, or Firm* — Sage Patent Group

(57) ABSTRACT

A transformer includes a transformer housing, a stationary contact, a load break rotary switch—and a magnetically sensitive indicator component. The load break rotary switch comprises a shaft, comprising a shaft portion which is disposed in an inner housing area and a shaft contact attached to the shaft portion. The load break rotary switch comprises a lever connected to the shaft portion with respect to a rotary axis in a rotationally fixed manner, wherein the lever comprises a lever portion having a radial distance from the rotary axis. The lever portion comprises a lever magnet. A magnetically sensitive indicator component is switched from its first state into its second state by the lever magnet when the shaft is rotated from the first position to the second position or vice versa. Thus, an operator can ensure that the shaft contact is disconnected from the stationary contact before performing a maintenance work.

17 Claims, 4 Drawing Sheets

TRANSFORMER COMPRISING A LOAD BREAK ROTARY SWITCH

CROSS REFERENCE TO RELATED APPLICATIONS

This application is a 35 U.S.C. § 371 national stage application of PCT International PCT/EP2021/080729 filed on Nov. 5, 2021, which claims priority to European Patent Application 20206140.4, filed on Nov. 6, 2020, the disclosures and content of which are incorporated by reference herein in their entireties.

TECHNICAL FIELD

The present disclosure relates to a transformer comprising a load break rotary switch.

BACKGROUND

A transformer is a passive electrical device that transfers electrical energy from one electrical circuit to another, or to multiple circuits. The transformer typically comprises a ferromagnetic core having limbs extending between a first yoke and a second yoke. Coils are wounded around the limbs. A varying current in any one of the coils produces a varying magnetic flux in the core, which induces a varying electromotive force across any other coil wound around the core.

It is well known in the art to use an oil immersed transformer wherein oil cools and insulates the windings. The transformer comprises a tank for holding the oil.

Further, a pad mounted oil immersed transformer is known that comprises a load make (or load break) rotary switch. The switch is designed for selectively connecting a network via the transformer electrically to a line, such as a distribution line, or to disconnect the network from the line in accordance with demand and/or maintenance activities.

The load break rotary switch can be rotated with respect to a housing of the transformer and comprises a shaft having an electrical contact, e.g., in the form of a contact blade. A further contact in the form of a stationary contact that is, for example, electrically connected to the network is arranged stationary with respect to the housing. The rotary switch can be rotated between an ON position wherein the contact blade is in electrical contact with the stationary contact and an OFF position wherein the contact blade is not electrically connected to the stationary contact. When the rotary switch is in the OFF position, the contact blade is not connected to any voltage. When the rotary switch is in the ON position, the contact blade is closed, engaging the stationary contact, thus, the "bridge" is re-established and the transformer is back in the network.

Despite such a transformer is typically maintenance free, a network disconnection is usually required, e.g., to perform maintenance on a line. Typically, a switch handle is arranged on an external wall of the transformer housing that can be used to de-energize the transformer by rotating the load break rotary switch into its OFF position via the handle and to energize the transformer by rotating the load break rotary switch into its ON position, also via the handle. De-energizing and energizing the transformer is usually achieved by rotating the switch handle with a hot stick.

Experience has shown that it may happen under particular circumstances that the contact blade is in contact with the stationary contact, i.e., the transformer is energized despite the handle indicating the OFF position of the rotary switch. This condition naturally represents a major concern or severe danger for the safety of an operator of the transformer.

It is known to provide a transformer housing wall with an elongated window extending parallel to a main axis of the load break rotary switch, making it possible to check the status of the contacts visually. However, such a window implies an enlarged risk for development of a leakage leading to an oil loss.

SUMMARY

There is a need to provide a transformer showing improved safety features. There is particularly a need to provide a transformer showing improved safety features with respect to maintenance operations.

This object is achieved by the independent claim. Dependent claims refer to additional embodiments.

According to the present disclosure, a transformer is provided which comprises a transformer housing, a stationary contact, a load break rotary switch and a magnetically sensitive indicator component. The transformer housing comprises a transformer housing wall separating an inner housing area from an outer housing area. The stationary contact is disposed stationary relative to the housing. The load break rotary switch comprises a shaft, comprising a shaft portion which is disposed in the inner housing area and a shaft contact attached to the shaft portion. The shaft is supported with respect to the transformer housing wall rotatably about a rotary axis between a first position in which the shaft contact is electrically connected to the stationary contact and a second position in which the shaft contact is electrically not connected to the stationary contact. The load break rotary switch further comprises a lever connected to the shaft portion with respect to the rotary axis in a rotationally fixed manner, wherein the lever comprises a lever portion having a radial distance from the rotary axis. The lever portion comprises a lever magnet. The magnetically sensitive indicator component is attached to the transformer housing wall, wherein the magnetically sensitive indicator component is placeable selectively into a first state in which the magnetically sensitive indicator component is indicative of the first state and into a second state in which the magnetically sensitive indicator component is indicative of the second state. The magnetically sensitive indicator component is switched from its first state into its second state by the lever magnet when the shaft is rotated from the first position to the second position or vice versa.

Since the magnetically sensitive indicator component is switched from its first state into its second state when the shaft is rotated from the first position to the second position or vice versa, the magnetically sensitive component allows an operator of the transformer to check by simply realizing or determining the state of the magnetically sensitive indicator component an actual or current status of the shaft contact vis-à-vis the stationary contact. Thus, a risk of injury for the operator can be at least reduced by checking the actual status of the shaft prior to performing an activity, e.g., a maintenance activity within the transformer or on the distribution line.

In other words, a transformer according to the present application provides a "remote signal" of the actual status of the contacts. The position of the lever reflects the real orientation of the shaft contact. Thus, the risk of a fault indication can be significantly further reduced. Moreover, it is not necessary to provide a window within the transformer housing or tank. In this manner a risk of an oil loss is as well reduced.

Here, the stationary contact and the load break rotary switch are described as being two different parts of the transformer. However, it is noted that alternatively, the stationary contact may be regarded as constituting a part of the load break switch.

Various embodiments may implement the following features:

In some embodiments, the lever magnet and the magnetically sensitive component are positioned on a line parallel to the rotary axis when the shaft is in its second position. For example, the line and the rotary axis have a distance from each other which is essentially equal to the radial distance. For example, the distance between the line and the rotary axis may be within 80% to 120% of the radial distance, for example between 90% and 110%.

In some embodiments, the shaft contact is attached to the shaft portion in a rotationally fixed manner.

In some embodiments, the magnetically sensitive indicator component is disposed within the outer housing area. This allows for an easy and safe determination of the state of the magnetically sensitive indicator component.

In some embodiments, the load break rotary switch is a manually operable switch.

In some embodiments, the transformer further comprises a handle disposed in the outer housing area, wherein the handle is configured to initiate, upon a manipulation of the handle, a rotation of the shaft from the first position into the second position or vice versa. This allows for a facilitated manageability. The handle may be supported with respect to the transformer housing wall rotatably about a handle rotary axis. The handle rotary axis may coincide with the rotary axis of the shaft. Alternatively, the handle rotary axis may be parallel to the rotary axis of the shaft having an offset vis-à-vis the rotary axis of the shaft.

In some embodiments, the magnetically sensitive indicator component comprises a switch, particularly a reed or a sensor.

In some embodiments, the magnetically sensitive indicator component is arranged within a projection of the lever magnet parallel to the rotary axis. This is advantageous regarding a safe switching of the magnetically sensitive indicator component effectuated by the lever magnet.

In some embodiments, the magnetically sensitive indicator component is arranged—with respect to the rotary axis—out of a projected area defined by a movement of the handle associated with a rotation of the shaft between its first and its second position. This is advantageous regarding an easy and safe determination, particularly visual determination of the state of the magnetically sensitive indicator component.

In some embodiments, the magnetic sensitive indicator component comprises a visually and/or audible perceivable element, for example a light emitting diode (LED), wherein the magnetically sensitive indicator component is configured such that the visually and/or audible perceivable element indicates whether the magnetic sensitive indicator component is in its first state or in its second state.

In some embodiments, the transformer further comprises at least one further stationary contact fixedly disposed relative to the housing, wherein at least one further shaft contact is fixedly attached to the shaft portion, wherein, when the shaft is in the first position, the at least one further shaft contact is electrically connected to the at least one further stationary contact and, when the shaft is in the second position, the at least one further shaft contact is electrically disconnected from the at least one further stationary contact.

In some embodiments, the load break rotary switch is a three-phase switch. The load break rotary switch may be a two-positions switch or a four-positions switch.

In some embodiments, the transformer is a submersible transformer, particularly an oil-immersed transformer. In such a case, the load break rotary switch is particularly suited.

In some embodiments, the transformer comprises a tank, wherein the housing wall is a wall of the tank.

In some embodiments, the transformer is a pad mounted transformer.

In some embodiments, the transformer is a distribution transformer.

In some embodiments, the shaft contact is a blade contact.

In some embodiments, the transformer further comprises a core and a winding, wherein the stationary contact is electrically connected to the winding. For example, the winding may be a high-voltage winding, wherein the stationary contact is electrically connected to the high-voltage winding, e.g., via a cable gland.

A transformer according to the disclosure offers the possibility for an operator to realize in a reliable, quick and safe manner an actual status of the contact situation, i.e., ON or OFF of the load break rotary switch. A fault indication can be practically avoided. Thus, the operator can determine the status of the contact situation before performing a maintenance operation or a similar work. Accordingly, it is possible to significantly reduce the risk for an injury to the operator during such actions. Moreover, the described construction allows for a cheap construction.

BRIEF DESCRIPTION OF THE DRAWINGS

The subject-matter of the disclosure will be explained in more detail with reference to exemplary embodiments which are illustrated in the attached drawings, in which.

DETAILED DESCRIPTION

Example embodiments of the disclosure will be described with reference to the drawings in which identical or similar reference signs designate identical or similar elements. The features of embodiments may be combined with each other, unless specifically noted otherwise.

Figure 1A:
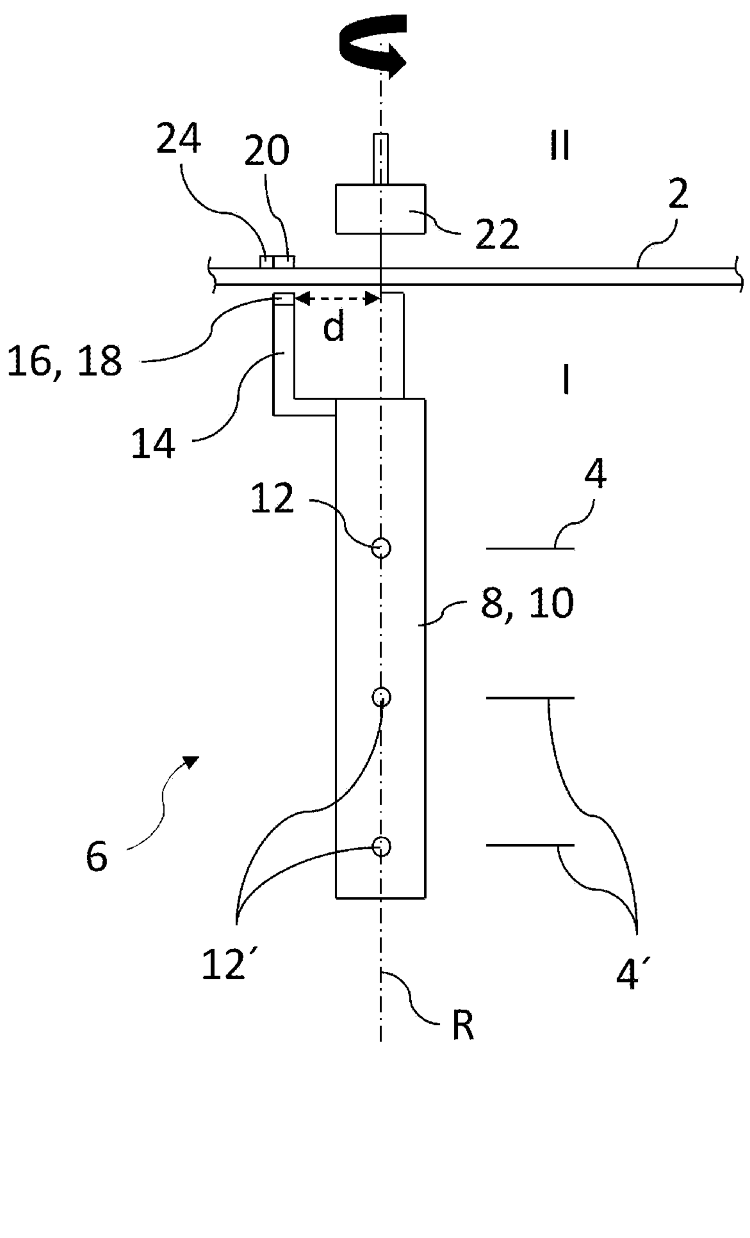
FIG. 1*a* is a schematic cross-sectional view of a load break rotary switch mounted within a transformer housing wall and stationary contacts, wherein contacts of the load break rotary switch are disconnected from the stationary contacts.

FIG. 1*a* is a schematic cross-sectional view of a load break rotary switch 6 of a transformer. The term "load break rotary switch" as used herein indicates a rotary switch designed and arranged to make and to break a load of a transformer. Accordingly, the load break rotary switch might be as well indicated as "load break and load make rotary switch".

The transformer comprises a transformer housing having a transformer housing wall 2. Only a part of the transformer housing wall 2 is illustrated in FIG. 1*a*. The transformer housing wall 2 surrounds elements of the transformer such as, e.g., a core and a winding (not illustrated in the figures) as well-known as such in the art.

The transformer may be designed to selectively connect and disconnect a network to or from a distribution line. The transformer may be a distribution transformer. The transformer may be a pad mounted transformer.

For example, the transformer may be an oil-immersed transformer having a tank filled with oil, wherein the core and the winding are at least partly submerged within the oil. The tank may be arranged within the housing. Alternatively, the housing wall 2 may be a wall of the tank.

The transformer housing wall 2 separates an inner housing area I from an outer housing area II. The inner housing area I may be at least partly filled with the oil. The outer housing area II may be an area exterior to the housing, wherein the outer housing area II is accessible to an operator of the transformer.

The transformer comprises a stationary contact 4 disposed stationary relative to the housing, i.e., relative to the transformer housing wall 2. The stationary contact 4 may be electrically connected e.g., to the network. The stationary contact 4 may be electrically connected to the winding of the transformer.

The load break rotary switch 6 comprises a shaft 8. The shaft 8 comprises a shaft portion 10 which is disposed in the inner housing area I and a shaft contact 12 attached to the shaft portion 10, particularly fixed to the shaft portion 10. The shaft contact 12 may be electrically connected e.g., to the distribution line. The shaft contact 12 may be a blade contact.

Figure 1B:
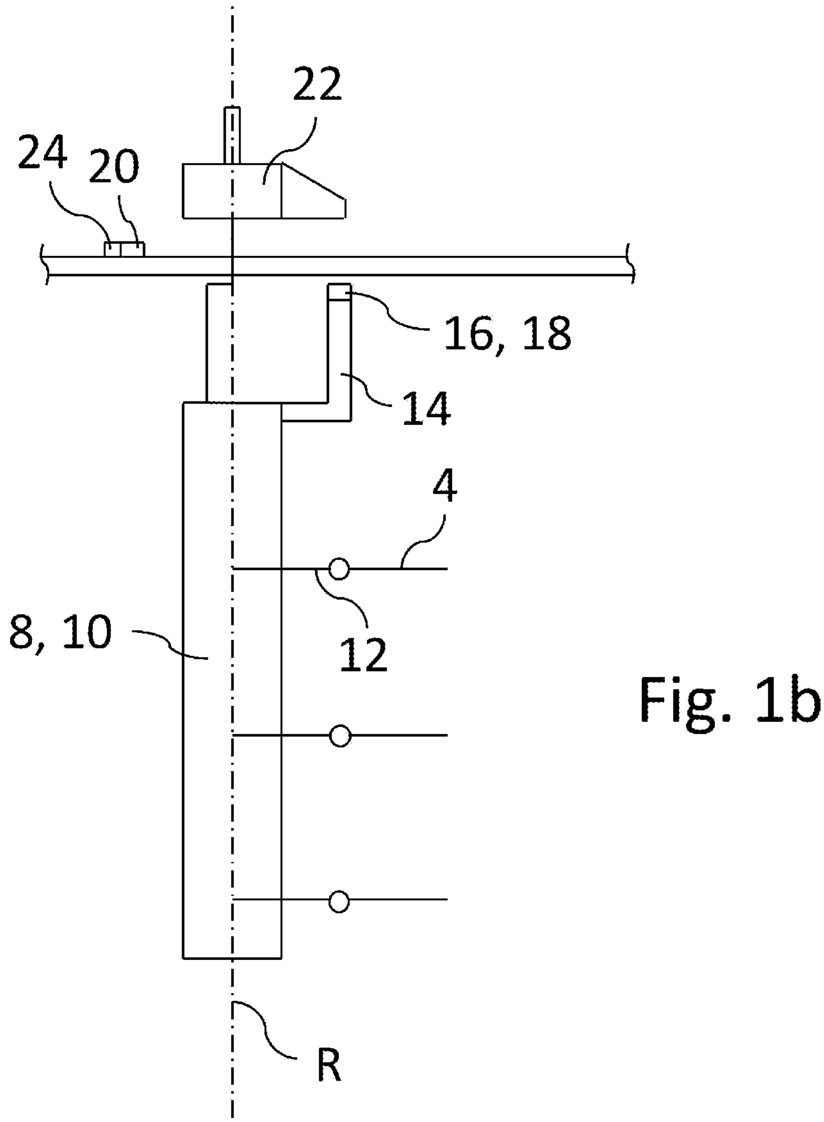
FIG. 1*b* is a corresponding view, wherein the contacts of the load break rotary switch are connected to the stationary contacts.

The shaft 8 is supported with respect to the transformer housing wall 2 rotatably about a rotary axis R between a first position in which the shaft contact 12 is electrically connected to the stationary contact 4 and a second position in which the shaft contact 12 is not electrically connected to the stationary contact 4. FIG. 1*a* shows a state in which the shaft contact 12 is not electrically connected to the stationary contact 4, i.e., in which the shaft is in its second position, whereas FIG. 1*b* shows a state in which the shaft contact 12 is electrically connected to the stationary contact 4, i.e., in which the shaft is in its first position.

The load break rotary switch 6 further comprises a lever 14. The lever 14 is connected to the shaft portion 10 with respect to the rotary axis R in a rotationally fixed manner. The lever 14 may be an integral part of the shaft portion 10. Alternatively, the lever 14 may be a separate part, attached to the shaft portion 10 for example by a plug-in connection.

The lever 14 comprises a lever portion 16 having a radial distance d from the rotary axis R, wherein the lever portion 16 comprises a lever magnet 18. For example, the lever 14 may be L-shaped as exemplarily illustrated in FIG. 1*a* with one of the arm or—as illustrated in FIG. 1*a*—the stem of the "L" comprising the lever portion 18. The lever magnet 18 is arranged such that it has only a small distance from the transformer housing wall 2, for example a distance that is smaller than the radial distance d, such as smaller than 0.5 d. The design is further such that the distance of the lever magnet 18 from the transformer housing wall 2 does not change as the shaft 8 is rotated between its first and second position.

The transformer further comprises a magnetically sensitive indicator component 20 attached to the transformer housing wall 2. For example, the magnetically sensitive component may be disposed within the outer housing area II. The magnetically sensitive indicator component 20 is placeable selectively into a first state in which the magnetically sensitive indicator component 20 is indicative of the first state and into a second state in which the magnetically sensitive indicator component 20 is indicative of the second state.

When the shaft 8 is rotated from the first position to the second position, the magnetically sensitive indicator component 20 is switched from its first state into its second state—or vice versa—by the lever magnet 18.

Thus, it is possible for the operator of the transformer to determine whether the shaft 8 is in its first or second position and correspondingly to determine whether or not the shaft contact 12 is electrically connected to the stationary contact 4. Therefore, the operator can make sure that—for example—the transformer is disconnected from the network before doing a maintenance work at the line.

The transformer may further comprise a handle 22 disposed in the outer housing area II, wherein the handle 22 is connectable or connected to the shaft 8. For example, the handle 22 may be configured to initiate, upon a manipulation of the handle 22, a rotation of the shaft 8 from the first position into the second position or vice versa.

Figure 2A:
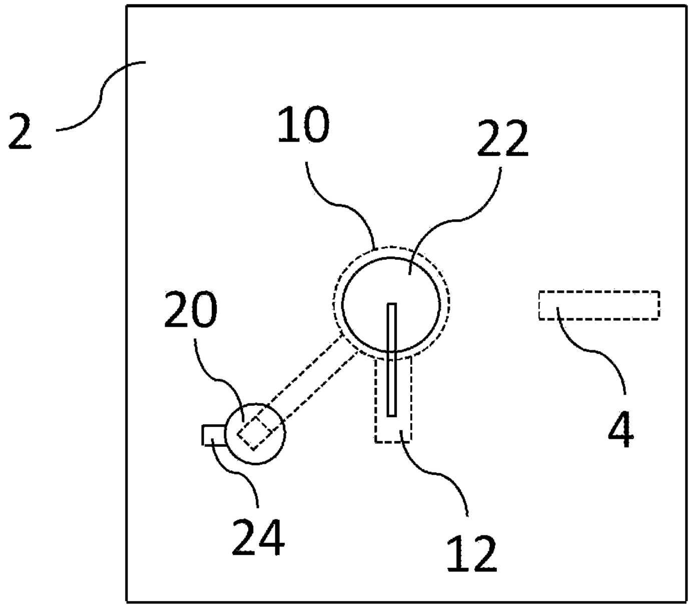
FIG. 2*a* is a schematic plan view showing the load break rotary switch and the stationary contacts illustrated in FIG. 1*a*.
Figure 2B:
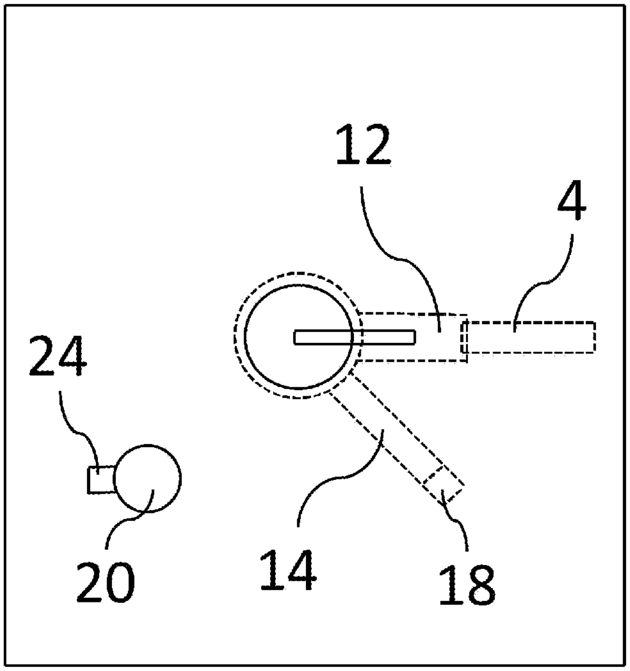
FIG. 2*b* is a corresponding plan view showing the load break rotary switch and the stationary contacts illustrated in FIG. 1*b*.

FIGS. 2*a* and 2*b* show schematically plan views of the arrangements illustrated in FIGS. 1*a* and 1*b*, respectively.

The magnetically sensitive indicator component 20 may comprise a switch, particularly a reed or a sensor. The magnetically sensitive component 20, particularly in the form of a reed or a sensor, can be connected with a control panel of a sub-station. Thus, a system comprising at least two transformers according to the present application makes it possible for an operator to monitor, instantly, load break rotary switches installed on the at least two transformers.

In some embodiments, the magnetically sensitive indicator component 20 comprises a visually and/or audible perceivable element 24, for example a LED, wherein the magnetically sensitive indicator component 20 is designed such that the visually and/or audible perceivable element 24 indicates whether the magnetic sensitive indicator component 20 is in its first state or in its second state. In this manner, a particularly easy and safe determination of the position of the shaft 8 is possible for the operator.

The transformer may further comprise at least one further stationary contact 4' fixedly disposed relative to the housing, wherein at least one further shaft contact 12' is fixedly attached to the shaft portion 10, wherein, when the shaft 8 is in the first position, the at least one further shaft contact 12' is electrically connected to the at least one further stationary contact 4' and, when the shaft 8 is in the second position, the at least one further shaft contact 12' is not electrically connected to the at least one further stationary contact 4'. For example, as illustrated in FIG. 1*a*, the load break rotary switch may be a three-phase switch.

While the disclosure has been described in detail in the drawings and forgoing description, such description is to be considered illustrative or exemplary and not restrictive. Variations to the disclosed embodiments can be understood and effected by those skilled in the art and practicing the claimed subject matter, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A transformer, comprising:

a transformer housing, comprising a transformer housing wall separating an inner housing area from an outer housing area;

a stationary contact disposed stationary relative to the housing;

a load break rotary switch comprising a shaft, comprising a shaft portion which is disposed in the inner housing area and a shaft contact attached to the shaft portion, wherein the shaft is supported with respect to the transformer housing wall rotatably about a rotary axis (R) between a first position in which the shaft contact is electrically connected to the stationary contact and a second position in which the shaft contact is electrically not connected to the stationary contact; and a lever connected to the shaft portion with respect to the rotary axis (R) in a rotationally fixed manner, wherein the lever is an integral part of the shaft portion or a separate part, attached to the shaft portion, wherein the lever comprises a lever portion having a radial distance (d) from the rotary axis (R), wherein the lever portion comprises a lever magnet, wherein the lever is disposed entirely within the inner housing area; and a magnetically sensitive indicator component attached to the transformer housing wall, wherein the magnetically sensitive indicator component is placeable selectively into a first state in which the magnetically sensitive indicator component is indicative of the first state and into a second state in which the magnetically sensitive indicator component is indicative of the second state, wherein the magnetically sensitive indicator component is switched from its first state into its second state by the lever magnet when the shaft is rotated from the first position to the second position or vice versa.

2. The transformer of claim 1, wherein the magnetically sensitive indicator component is disposed within the outer housing area.

3. The transformer of claim 1, further comprising a handle disposed in the outer housing area, wherein the handle is configured to initiate, upon a manipulation of the handle, a rotation of the shaft from the first position into the second position or vice versa.

4. The transformer of claim 1, wherein the magnetically sensitive indicator component comprises a switch.

5. The transformer of claim 1, wherein the magnetic sensitive indicator component comprises a visually and/or audible perceivable that indicates whether the magnetic sensitive indicator component is in its first state or in its second state.

6. The transformer of claim 1, further comprising at least one further stationary contact fixedly disposed relative to the housing, wherein at least one further shaft contact is fixedly attached to the shaft portion, wherein, when the shaft is in the first position, the at least one further shaft contact is electrically connected to the at least one further stationary contact and, when the shaft is in the second position, the at least one further shaft contact is electrically disconnected from the at least one further stationary contact.

7. The transformer of claim 1, wherein the load break rotary switch is a three-phase switch.

8. The transformer of claim 1, wherein the transformer is a submersible transformer.

9. The transformer of claim 8, wherein the transformer comprises a tank and the housing wall is a wall of the tank.

10. The transformer of claim 1, wherein the transformer is a pad mounted transformer.

11. The transformer of claim 1, wherein the transformer is a distribution transformer.

12. The transformer of claim 1, wherein the shaft contact is a blade contact.

13. The transformer of claim 1, further comprising a core and a winding, wherein the stationary contact is electrically connected to the winding.

14. The transformer of claim 4, wherein the switch comprises a reed or a sensor.

15. The transformer of claim 5, wherein the visually perceivable element comprises a light emitting diode.

16. The transformer of claim 8, wherein the submersible transformer comprises an oil-immersed transformer.

17. The transformer of claim 13, wherein the winding comprises high-voltage winding.

* * * * *